United States Patent Office 3,495,000
Patented Feb. 10, 1970

3,495,000
ORAL SUSTAINED RELEASE MEDICAMENT MATRIX OF DIALDEHYDE STARCH ADMIXED WITH ETHYL CELLULOSE, POLYVINYL CHLORIDE OR POLYVINYLPYRROLIDONE
Shari J. Merabi and Samuel B. Prussin, Los Angeles, Calif., assignors to Dart Industries Inc., Los Angeles, Calif., a corporation of Delaware
No Drawing. Filed Jan. 26, 1968, Ser. No. 700,717
Int. Cl. A61k 27/12, 9/00
U.S. Cl. 424—22    3 Claims

ABSTRACT OF THE DISCLOSURE

Insoluble matrix type sustained release medicinal compositions adapted for peroral administration are described wherein the active medicinal agent is distributed in a matrix comprising an admixture of a dialdehyde starch and polyvinylpyrrolidone, polyvinyl chloride or ethyl cellulose.

---

This invention relates to sustained release medicinal compositions which are intended for peroral administration. More particularly, the invention relates to insoluble matrix type sustained release medicinal compositions adapted for peroral administration in the form of tablets, pills, lozenges and the like, or in the form of granules filled into hard-shell gelatine capsules, wherein the medicament is intimately and cohesively admixed with an indigestible material that is resistant to distintegration in the gastro-intestinal tract.

A variety of techniques have been employed in the art to provide sustained release medicinal compositions. Among the techniques commonly employed in the pharmaceutical art for the manufacture of sustained release medicinal compositions are: coating of the medicament with a slowly distintegratable material, embedding the medicament in a wax-fat vehicle or porous plastic base, binding the medicament to an ion-exchange resin, or complexing the medicament with a high molecular weight colloidal material. In these techniques a barrier is provided through physical or chemical means which delays release of the medicament from the particular dosage form administered.

Particularly useful among the aforementioned techniques is that wherein the medicament is dispersed within a coherent and porous matrix made up of an insoluble material. The medicament in this type of sustained release composition is released to the gastrointestinal tract by means of a controlled leaching-out process. There is some penetration of the core by gastrointestinal fluid with some dissolution of the drug when soluble. The core becomes smaller by breaking up into smaller particles and does not become devoid of medication until it is completely disintegrated. Although this technique is ideally suited for preparing sustained release medicinal preparations wherein the medicament is insoluble, it may also be used for soluble medicaments.

It is an object of this invention to provide a sustained release medicinal preparation wherein the medicament is slowly but uniformly released in the gastrointestinal tract.

It is also an object of this invention to provide a matrix type sustained release medicinal preparation that does not require the addition of soluble substances to the matrix in order to facilitate the release of the medicament.

It is also an object of this invention to provide a matrix-type sustained release medicinal preparation that is easily prepared and ideally suited to use with insoluble or soluble medicaments.

Other objects and advantages of this invention will become apparent from the following detailed description.

The invention sought to be patented is described as residing in the concept of an insoluble matrix type medicinal composition wherein the active medicinal agent is uniformly distributed within a matrix comprising an admixture of a dialdehyde starch having a dialdehyde number of at least 90 and ethyl cellulose, polyvinyl chloride or polyvinylpyrrolidone.

The manner and process for making and using the invention will now be generally described so as to enable one skilled in the art of pharmaceutical chemistry to make and use the same as follows:

The matrix in the sustained release medicinal preparations in accordance with this invention comprises an admixture of a dialdehyde starch having a dialdehyde number of at least 90 and ethyl cellulose, polyvinyl chloride or polyvinylpyrrolidone.

The starch molecule consists of a long chain of anhydroglucose units, each unit in the chain having the following formula:

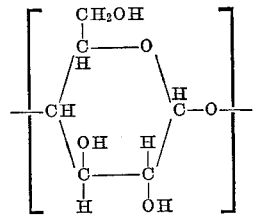

It is known in the art of starch chemistry that starch can be selectively oxidized under influence of periodate ion, resulting in the oxidation of the two adjacent hydroxyl groups in the anhydroglucose units of the starch molecule to the aldehyde form, each selectively oxidized unit having the following structural formula:

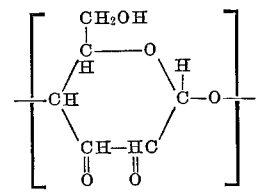

The resulting selectively oxidized starch is commonly known in the art as dialdehyde starch, the name derived from the fact that each anhydroglucose unit which has been selectively oxidized contains two aldehyde groups. A chemical procedure for carrying out the selective oxidation chemically is described in Journal of American Chemical Society, vol. 73: 4484 (1951) and electrolytic selective oxidation techniques are described in U.S. Patents 2,648,629 and 2,713,553, By varying the conditions of the oxidation, it is possible to oxidize selectively varying percentages of the number of anhydroglucose units in the original starch molecule. The degree of such oxidation is referred to throughout the specification and in the claims by the term "dialdehyde number," which means the number of the original anhydroglucose units of the starch molecule which are in the dialdehyde form for each 100 units in the chain. It has been found that a dialdehyde number of at least 90 is required for dialdehyde starches useful in the preparation of admixtures comprising the matrix of the sustained release medicinal preparations in accordance with this invention. Such dialdehyde starches have been found to be substantially free of toxicity and hence useful in preparations intended for oral administration.

In the sustained release medicinal compositions according to the present invention the matrix will represent between 5 percent and 20 percent of the total composition, the remainder being made up of medicament or medicament plus a pharmaceutical diluent.

Surprisingly, substitution in the matrix of closely related pharmaceutically acceptable polymers, for example, methylcellulose or carboxymethylcellulose, in the place of ethyl cellulose, polyvinyl chloride or polyvinylpyrrolidone results in a composition devoid of sustained release characteristics. Only when the matrix comprises an admixture of a dialdehyde starch as hereinabove defined, and ethyl cellulose, polyvinyl chloride or polyvinylpyrrolidone does the composition possess sustained release characteristics.

The invention is intended to be used with both soluble and insoluble medicaments, and such medicaments alone or together with a pharmaceutically acceptable diluent make up the bulk of the sustained release composition, representing between 80 percent and 95 percent of the total composition. In preparing the sustained release compositions according to the present invention the quantity of such medicament present will be dependent upon its potency and the dose at which it is normally administered. Thus, where the medicament is normally administered in doses of a few milligrams or less such as in the case of alkaloids or hormones for example atropine sulfate or cortisone, the amount of medicament present may represent less than 1% of the total composition. In such cases the use of a pharmaceutical diluent such as, for example dicalcium phosphate will be required to increase the bulk of the non-matrix portion of the composition. On the other hand, where the normal dose administered is from several hundred milligrams to as much as a gram, as for example in the case of aspirin, a diluent is not required and the medicament alone makes up the bulk of the composition.

In preparing the sustained release compositions according to the present invention, the medicinally active component, which is preferably a water-insoluble medicament, alone or together with a diluent is mixed with the dialdehyde starch, as hereinabove defined, and the ethyl cellulose, polyvinylpyrrolidone or polyvinyl chloride and the mixture is then granulated with any suitable granulating agent, such as ethyl alcohol; or, the ethyl cellulose, polyvinylpyrrolidone or polyvinyl chloride is first solubilized in a suitable solvent, such as ethyl alcohol, and then the mixture of medicament, or medicament plus diluent, and dialdehyde starch is granulated with such a solution.

The composition of the final granulation will contain between 80 percent and 95 percent of medicament or medicament plus diluent. The remainder of the granulation is comprised of the matrix, wherein the dialdehyde starch represents between 50 percent and 95 percent, and preferably between 60 percent and 90 percent of the matrix, and the ethyl cellulose, polyvinyl chloride or polyvinylpyrrolidone represents between 5 percent and 50 percent, and preferably between 10 percent and 40 percent of the matrix.

The granulation thus prepared may be used for the preparation of oral dosage forms such as tablets, pills, lozenges, capsules, and the like, by employing techniques and procedures commonly used in the pharmaceutical art for preparing such dosage forms. If desired, the granulation may be combined with an immediate release composition to provide for an initial response upon administration of the medicament.

The best mode contemplated by the inventors for carrying out their invention will now be set forth as follows:

EXAMPLE 1

Three granulations were prepared containing aspirin as the active ingredient; one with the admixture of dialdehyde starch and ethylcellulose, one with dialdehyde starch but without the ethyl cellulose, and one with ethyl cellulose but without dialdehyde starch.

(a) Aspirin-dialdehyde starch-ethyl cellulose:

|  | Grams |
|---|---|
| Acetyl salicylic acid, powdered | 184.0 |
| Dialdehyde starch (dialdehyde number=90) | 15.0 |

Mix well and granulate with a solution of ethyl cellulose (1.0 gram) in absolute ethanol (49 ml.)

(b) Aspirin-ethyl cellulose:

|  | Grams |
|---|---|
| Acetyl salicylic acid, powdered | 199.0 |

Granulate with a solution of ethyl cellulose (1.0 gram in absolute ethanol (49 ml.)

(c) Aspirin-dialdehyde starch:

|  | Grams |
|---|---|
| Acetyl salicyclic acid, powdered | 185.0 |
| Dialdehyde starch (dialdehyde number=90) | 15.0 |

Mix well and granulate with absolute ethanol (45 ml.). Dry overnight with forced room temperature air Dried granules prepared from these granulations were tested for their sustained release characteristics according to the following procedure:

Procedure for determination of sustained release rate by rotating bottle method

A 2 gm. sample of granules, or a sample equivalent to 3 tablets, is accurately weighed into a 80 ml. glass vial fitted with a plastic lined screw cap.

60 ml. of digestive fluid is added and the vial mounted in the apparatus which is maintained at 37° C. (plus or minus 1° C.).

The following schedule is used:

|  | pH |
|---|---|
| (1) 1 hour—Simulated Gastric Fluid | 1.5 |
| (2) 1 hour—Simulated Intestinal Fluid | 4.5 |
| (3) 2 hours—Simulated Intestinal Fluid | 6.9 |
| (4) 1 hour—Simulated Intestinal Fluid | 6.9 |
| (5) 2 hours—Simulated Intestinal Fluid | 7.2 |
| (6) 1 hour—Simulated Intestinal Fluid | 7.5 |

The digestive fluids used are made according to USP XV. The residues are removed at desired intervals by emptying the vials through a 40 mesh screen. The residue on the screen is then rinsed with distilled water. It is then drained from excess water by pressing the screen to a towel or paper towel. The residue is then put on a watch glass and dried in a 45° C. oven overnight. The residue is then weighed and the percentage weight loss is plotted. Then they are assayed for drug percentage weight loss.

The results are as follows:

| Granulation composition | Percent released | | | |
|---|---|---|---|---|
|  | 1 hr. | 2 hrs. | 3 hrs. | 6 hrs. |
| Aspirin-dialdehyde starch-ethyl cellulose | 29.0 | 36.3 | 49.8 | 93.3 |
| Aspirin-ethyl cellulose | 100.0 | | | |
| Aspirin-dialdehyde starch | 93.0 | 99.7 | | |

EXAMPLE 2

Two granulations were prepared containing aspirin as the active ingredient; one with the admixture of dialdehyde starch and polyvinyl chloride and one with polyvinyl chloride but without dialdehyde starch.

(a) Aspirin-dialdehyde starch-polyvinyl chloride:

|  | Grams |
|---|---|
| Acetyl salicylic acid, powdered | 160 |
| Dialdehyde starch (dialdehyde number=90) | 10.0 |
| Polyvinyl chloride | 10.0 |

Mix well and granulate with absolute ethanol (50 ml.).

(b) Aspirin-polyvinyl cholride:

|  | Grams |
|---|---|
| Acetyl salicylic acid, powdered | 170.0 |
| Polyvinyl chloride | 10.0 |

Mix well and granulate with absolute ethanol (50 ml.).

Employing the technique described in Example 1, dried granules prepared from these two granulations were tested for their sustained release characteristics. The results are as follows:

| Granulation composition | Percent released | | | |
|---|---|---|---|---|
| | 1 hr. | 2 hrs. | 4 hrs. | 6 hrs. |
| Aspirin-dialdehyde starch-polyvinyl chloride | 35.0 | 49.5 | 75.8 | 80.6 |
| Aspirin-polyvinyl chloride | 100.0 | | | |

EXAMPLE 3

Two granulations were prepared containing aspirin as the active ingredient; one with the admixture of dialdehyde starch and polyvinyl pyrrolidone and one with polyvinylpyrrolidone but without dialdehyde starch.

(a) Aspirin-dialdehyde starch-polyvinylpyrrolidone:

|  | Grams |
|---|---|
| Acetylsalicyclic acid, powdered | 180.0 |
| Dialdehyde starch (dialdehyde number=90) | 15.0 |
| Mix well and granulate with a solution of polyvinylpyrrolidone (5.0 grams) in absolute ethanol (45 ml.). | |

(b) Aspirin-polyvinylpyrrolidone:

|  | Grams |
|---|---|
| Acetylsalicyclic acid, powdered | 195.0 |
| Granulate with a solution of polyvinylpyrrolidone (5.0 grams) in absolute ethanol. | |

Employing the technique described in Example 1, dried granules prepared from these two granulations were tested for their sustained release characteristics. The results are as follows:

| Granulation composition | Percent released | | | |
|---|---|---|---|---|
| | 1 hr. | 2 hrs. | 4 hrs. | 6 hrs. |
| Aspirin-dialdehyde starch-polyvinylpyrrolidone | 12.5 | 39.8 | 54.4 | 89.4 |
| Aspirin-polyvinylpyrrolidone | 99.7 | 100.8 | | |

In the foregoing examples, the granulations prepared with the admixture of dialdehyde starch and ethyl cellulose, polyvinyl chloride or polyvinylpyrrolidone displayed superior sustained release characteristics.

The following examples are illustrative of other granulations prepared according to the present invention:

EXAMPLE 4

|  | Grams |
|---|---|
| Atropine sulfate, powdered | 1.6 |
| Dicalcium phosphate | 158.4 |
| Dialdehyde starch (dialdehyde number=90) | 10.0 |
| Ethyl cellulose | 10.0 |
| Mix well and granulate with absolute ethanol (50 ml.). | |

EXAMPLE 5

|  | Grams |
|---|---|
| Cortisone acetate, powdered | 1.8 |
| Dicalcium phosphate | 182.2 |
| Dialdehyde starch (dialdehyde number=90) | 15.0 |
| Mix well and granulate with a solution of ethyl cellulose (1.0 gram) in absolute ethanol (49 ml.). | |

The subject matter which the applicants regard as their invention is particularly pointed out and distinctly claimed as follows:

1. A sustained release composition in oral dosage form comprising a solid medicament distributed in a matrix comprising an admixture of a dialdehyde starch having an aldehyde number of at least 90 and a pharmaceutically acceptable polymer selected from the group consisting of ethyl cellulose, polyvinyl chloride and polyvinylpyrrolidone, said matrix comprising between 50 percent and 95 percent by weight of said dialdehyde starch and between 5 percent and 50 percent by weight of said pharmaceutically acceptable polymer.

2. A sustained release composition according to claim 1 wherein said matrix comprises between 60 percent and 90 percent by weight of said dialdehyde starch and between 10 percent and 40 percent by weight of said pharmaceutically acceptable polymer.

3. A composition according to claim 1 wherein said medicament is acetyl salicylic acid.

References Cited

UNITED STATES PATENTS 2,788,546    4/1967    Mellies et al. _____ 264—331

S. K. ROSE, Primary Examiner

U.S. Cl. X.R.

424—82, 230, 361